United States Patent Office 2,739,983

Patented Mar. 27, 1956

2,739,983

PROCESS OF PREPARING OXANILIDE

Leslie M. Schenck, Westfield, N. J., assignor to General Aniline & Film Corporation, New York, N. Y., a corporation of Delaware No Drawing. Application August 20, 1954, Serial No. 451,290

6 Claims. (Cl. 260—558)

This invention relates to an improved process of preparing oxanilide.

The preparation of oxanilide (diphenyloxamide) is well known. The classical method involves the distillation of two mols of aniline with one mol of oxalic acid and has been reported by several investigators. A. W. Hoffman, Annalen 142, 122; Gerhardt, Annalen 60, 308; Piria, Jahresbericht uber die Fortschritte des Chemie, 1855, 540; and A. D. Macullum, J. Chem. Soc. 42, 468–70 (1923), heated a mixture of aniline and oxalic acid to the distillation point of aniline, ca. 180° C. and then heated the molten reaction mixture at about 180° C. for various intervals of time. The cooled product was then leached free of contaminants with alcohol, benzene, etc. Oxanilide has also been prepared by heating the aniline salt of oxalic acid at 200° C. with a 200° C. boiling cresol (Perkin, J. Chem. Soc. 61, 459); by heating aniline with two parts of an oxalic acid ester (Meyer, Berichte 29, 2640); by boiling oxamide with an excess of aniline (Biehringer, Borsum; Berichte 39, 3354), by the action of oxalyl chloride or aniline in ether and benzene (Bornwater, Recueil des travaux chimiques 31, 108); and through degradation of more complex compounds.

All of the foregoing processes are time consuming, require fairly high temperature, and give a product in low yields which requires several purification steps.

I have found that oxanilide is readily prepared in an extremely pure form and in a yield of about 90% of theory by heating two mols of aniline with one mol of oxalic acid dihydrate to 125°–135° C. in the presence of an inert solvent-diluent until four (4) mols of water are removed, cooling the reaction mixture and isolating the oxanilide by filtration, washing and drying. By this procedure, which is both economical and practical, the reaction is conducted at a substantially low temperature and advantage is taken of the principle of azeotropic distillation to remove water of hydration from the oxalic acid and to eliminate water of reaction from the reaction mixture itself in one operation.

In practicing the new process, two mols of aniline and one mol of oxalic acid dihydrate, dissolved in an inert solvent-diluent, with or without the presence of 0.5 to 1.0 mol of water, are heated to 100°–110° C. in a distillation flask equipped with a distillation column until approximately two-thirds of the theoretical amount, 4–5 mols, of water is removed as an azeotrope with the inert solvent-diluent. The presence of 0.5 to 1.0 mol of water in the reaction mixture, which is not absolutely necessary, tends to give a mixture which is more fluid, thereby facilitating the operating procedure. After partial removal of the water, the temperature of the reaction mixture is gradually increased to 125°–135° C. until four (4) mols of water, together with that added, is collected. The reaction mixture is then cooled to room temperature, the white crystalline product separated from the mother liquor by filtration, washed with an inert solvent and dried at 85° C.

As an alternative, the inert solvent-diluent and 2 mols of aniline are heated to 100°–110° C. and 1 mol of oxalic acid dihydrate added gradually. The reaction is gradually increased to 125°–135° C. until four (4) mols of water are collected. Similarly, the inert solvent-diluent and 1 mol of oxalic acid dihydrate may be heated to 100°–110° C. followed by the gradual addition of 2 mols of aniline and slowly increasing the temperature to 125°–135° C. until the theoretical amount of water is removed.

The nature of the inert solvent-diluent, which may be employed for the coreactants and for the washing at room temperature of the end product, is immaterial so long as it boils above 100° C., possess a dissolving or partially dissolving or solvent action on the two reactive components at the aforementioned temperatures, and is non-reactive. Illustrative of such solvent-diluents, the following may be mentioned:

Chlorobenzene
o- and p-dichlorobenzene
Nitrobenzene
o- and p-nitrochlorobenzene
m-, o-, and p-xylene
Dichloropropane
Octane
Nonane
Decylene
Octylene The amount of any one of the foregoing solvent-diluents or mixtures thereof is immaterial so long as a sufficient quantity is employed to dilute the coreactants. In general, the amount preferred is three parts of solvent-diluent or a mixture of solvent-diluents per one part of aniline.

Of all the solvents listed above, I prefer to employ o-dichlorobenzene, because of its commerical availability and cheapness in price.

The foregoing description of my improved process will be more apparent from the following examples which are set forth merely to illustrate the various steps in the process, and should not be construed as a limitation thereof. All the parts given are by weight.

*Example I*

1170 parts of o-dichlorobenzene, 400 parts of aniline, 252 parts of oxalic acid dihydrate and 30 parts of water were heated to 100°–110° C. in a distillation flask equipped with a distilling column normally employed in azeotropic distillation until two-thirds of the theoretical water had been removed as an azeotrope with dichlorobenzene. The temperature was gradually increased to 130° until the total theoretical weight of water was collected. Upon cooling, the white crystalline product was separated from the mother liquor by filtration, washed with o-dichlorobenzene and dried at 85° C. The yield of 431.7 parts of a product having a melting point of 225°–257° C. was obtained. This amounted to 90% of the theoretical yield.

*Example II*

1170 parts of o-dichlorobenzene and 400 parts of aniline were heated to 100°–110° C. There was gradually added 252 parts of oxalic acid dihydrate, and the reaction temperature gradually increased to 125°–135° C. until the total theoretical weight of water was collected. Upon cooling the product was collected by filtration, washed free with o-dichlorobenzene and dried at about 85° C. The yield obtained was 430 parts of a product which amounted to about 90% of the theoretical yield.

*Example III*

1170 parts of o-dichlorobenzene and 252 parts of oxalic acid dihydrate were heated to 100°–110° C. There was then gradually added 400 parts of aniline while slowly increasing the temperature to 125°–135° C. until the total theoretical weight of water was removed by distillation. Upon cooling the product was filtered, washed with o-dichlorobenzene and dried at about 85° C. The yield was the same as in Example II.

I claim:

1. The process of preparing oxanilide which comprises heating two mols of aniline with one mol of oxalic acid dihydrate, in the present of an inert solvent-diluent, to 125°–135° C. until the total theoretical weight of water is removed, cooling and isolating said oxanilide by filtration, washing and drying.

2. The process according to claim 1, wherein the solvent-diluent is o-dichlorobenzene.

3. The process according to claim 1, wherein the solvent-diluent is chlorobenzene.

4. The process according to claim 1, wherein the solvent-diluent is p-xylene.

5. The process according to claim 1, wherein the solvent-diluent is octane.

6. The process according to claim 1, wherein the solvent-diluent is dichloropropane.

References Cited in the file of this patent

Perkins: "J. Chem. Soc." (London) vol. 61 (1892), pp. 459–60.